Oct. 20, 1959   R. B. MATTHEWS   2,909,219
COMBINATION CONTROL DEVICE
Filed March 15, 1951   4 Sheets-Sheet 1

INVENTOR.
Russell B. Matthews
BY
Attys.

Oct. 20, 1959

R. B. MATTHEWS 2,909,219

COMBINATION CONTROL DEVICE

Filed March 15, 1951

INVENTOR.
Russell B. Matthews
BY
Attys.

United States Patent Office 2,909,219
Patented Oct. 20, 1959

2,909,219

COMBINATION CONTROL DEVICE

Russell B. Matthews, Wauwatosa, Wis., assignor to Baso Inc., Milwaukee, Wis., a corporation of Wisconsin Application March 15, 1951, Serial No. 215,714

38 Claims. (Cl. 158—131)

This invention relates, in general, to control devices, and has particular relation to an improved combination control device for controlling the flow of fuel, and more particularly the flow of gas for a burner.

The particular embodiment of the invention which will be described hereinafter in connection with the drawings provides an automatic main gas valve control, a thermoelectric safety shut-off, an electro-inductive or transformer control, a high temperature limit control, a manual "On" and "Off" control during electrical power failure, automatic means for returning the device to thermostat or condition-responsive control when electric power is restored, and 100% manual shut-off. It is to be understood, however, that the present invention is not limited to control devices having means for accomplishing all of the foregoing functions, but extends to numerous combinations of less than all of these functions.

One of the main objects of the present invention is to provide an improved automatic gas control valve with provisions for manually opening and closing the valve during power failure, and more particularly an automatic gas control valve in which the manual opening feature is so arranged that with the return of electrical power the valve is automatically released from manual control and returns to thermostat or other condition-responsive control.

Another object of the invention is to provide a combination control device having a manual 100% shut-off which, when operated, overcalls all automatic controls to close the valve and shut off all gas to the appliance, and more particularly a control device wherein when the 100% shut-off means is operated it is necessary to recock or reset a thermoelectric safety device and relight the pilot burner in order to place the apparatus back in operation.

Another object of the invention is to provide a control device of the class described wherein the valve member is of the pivoted or swinging type which swings clear, or substantially clear, of the gas stream when opened, whereby to provide a minimum of resistance to gas flow and thereby maximum capacity for a given pressure drop.

Another object of the invention is to provide a control device of the class described in which a thermoelectric safety shut-off feature is incorporated to provide 100% shut-off of gas to the appliance in the event the pilot burner flame is extinguished.

Another object of the invention is to provide a control device of the class described having automatic high temperature limit control means which is provided, for example, by a vapor-filled bellows and tube, or other high temperature limit control means which actuates the thermoelectric safety means to its released position to close off all gas to the appliance in the event the temperature surrounding the high temperature shut-off is excessive.

Another object of the invention is to provide in a control device of the class described, a pair of contacts which operate in conjunction with the thermoelectric safety means so that when the thermoelectric safety means is released to shut off the gas, these contacts will open and thereby remove electrical power from the thermostat or other condition-responsive circuit whereby to eliminate the possibility of the automatic valve operating in opposition to the thermoelectric safety means.

Another object of the invention is to provide a control device of the class described having a transformer function by means of a wound electro-inductive valve armature which provides suitable voltage for the thermostat or other condition-responsive circuit, and more particularly transformer means with which the power furnished to the thermostat or other condition-responsive circuit is current limited whereby to reduce fire hazard in case the thermostat or other condition-responsive leads are short-circuited.

Further features and advantages, and numerous adaptations of the invention will be apparent from the following detailed description and the accompanying drawings.

Referring now to the drawings, the embodiment of the invention selected for illustration comprises a valve body 1 having a fluid inlet 2 and a fluid outlet 3. A valve or main control member 4 cooperates with a valve seat 5 surrounding a port 6 to control the flow of fluid through the valve, for example the flow of gaseous fuel to a main burner.

In the illustrated embodiment of the invention, contiguous sections of a fuel supply pipe 7 are connected to the inlet 2 and outlet 3. The pipe section connected to the outlet 3 leads to a main burner 8 for the delivery of gaseous fuel thereto, for example, through a mixing chamber 9 to which air is admitted as well understood in the art.

A pilot burner 10 is disposed in juxtaposition to the main burner 8 to ignite the same. Gaseous fuel is delivered to the pilot burner 10 through a fuel supply tube 11 leading from an outlet 12 of a pilot burner valve body 13. A thermoelectric generator 14 has thermoelectric generator elements 15 and 16 joined at 17 to form a hot thermojunction which is positioned to be heated by the flame of the pilot burner 10 as long as the pilot burner is ignited. The thermoelectric generator 14 is shown in the form of a thermocouple, but may be in the form of a thermopile or of other suitable form. Lead conductors 18 and 19 connect the thermoelectric generator elements 15 and 16 in circuit with a terminal bushing 20 and terminal tip 21 which are insulated from each other and mounted, for example, in a terminal board 22.

A partition 23 is disposed internally and intermediate the ends of the pilot burner valve body 13. This partition has an axial port 23' provided at one end with a valve seat for a valve or pilot burner control member 24 and having at its opposite end a valve seat for a valve or pilot burner control member 25. A pilot fuel supply tube or duct 26 opens from the inlet or upstream side of the valve body 1 and leads to a passage 27 which opens into the port 23' intermediate the valve seats at its opposite ends. A passage 28, which opens through the partition 23, places the chambers within the pilot burner valve body 13 on opposite sides of the partition in communication.

A push button 30 mounted in one end of a cover 31 carries at its inner end an electromagnet 32 which comprises a magnet frame 33 and a coil 34 having its windings disposed about the legs of the magnet frame. The electromagnet 32 extends into a housing 35, and a guide 36 carried for movement with the push button 30 and electromagnet 32 is guided for reciprocatory movement in the housing 35. An operating shaft 37 extends into the opposite end of the housing 35 and has an armature 38 which is attached to the shaft 37 and disposed within the housing 35. A coiled spring 39 is interposed and acts between the guide 36 and the wall at the opposite end of the housing 35. A second coiled spring 40 is interposed and acts between the guide 36 and the armature 38.

The shaft 37 has a forked abutment or stop 41 which cooperates with a crank arm 42 which enters the valve body through a cover 43 and is fixed on a shaft 44 to turn this shaft by swinging movement of the arm 42. The valve member 4 is carried preferably pivotally at 45 by an arm 46 fixed on the shaft 44 to swing with turning movement of this shaft. As the valve 4 swings to open position, it swings clear, or substantially clear, of the gas stream, and thus provides a minimum resistance to gas flow and thereby maximum capacity for a given pressure drop.

A lever 47, pivoted at 48, has a forked end which straddles the reduced diameter inner end of the push button 30 and is engaged and swung clockwise by a flange 49 on the push button when same is depressed. The opposite end of the lever 47 engages a flange or head 50 on a stem 51 connected to the valve member 24 to actuate the valve member 24 to open position when the push button 30 is depressed. A coiled spring 52 is interposed and acts between the valve member 24 and one end of the valve body 13 to close the valve member 24, as will hereinafter appear.

A lever 54 is pivoted at 55 and cooperates at one end with a stop or abutment 55' on the reciprocatory shaft 37. The opposite end of the lever 54 engages a flange or head 56 on a stem 57 connected to the valve member 25 to actuate this valve member 25 to open position, as will hereinafter appear. A coiled spring 58 is interposed and acts between the valve member 25 and one end of the valve body 13 to close the valve member 25. The openings in the wall of the valve body 13 through which the stems 51 and 57 extend are preferably provided with suitable sealing or packing means (not shown) for preventing leakage of gas from the valve body 13 when either one of the valve members 24 or 25 is open.

The coil 34 of the electromagnet 32 is connected in circuit with the terminal bushing 20 and terminal tip 21 by lead conductors 60 and 61. These lead conductors 60 and 61 are preferably flexible and have sufficient slack to permit reciprocatory movement of the electromagnet 32 with the push button 30.

The improved control device is provided with condition responsive limit control means responsive to an extreme condition, for example high limit temperature. One form of such control means may comprise a vapor-filled bellows 62 mounted on a support 63 and connected by a tube 63' with a bulb 64 which in use is located where it will be responsive to temperatures for which it is desired to provide a limit control. The bellows 62 acts in conjunction with a member or abutment 65 which is fixed on the shaft 37.

A push button 70 is mounted on the terminal board 22 to be depressed against a spring 71, and acts when depressed to swing a lever 72 counterclockwise about its pivot 73. The lever 72 has an inwardly turned inner end 74 which, when the button 70 is depressed with the armature 38 held magnetically to the electromagnet 32 and the electromagnet in its outwardly projected position, is adapted to engage the stop or abutment 41 to break the magnetic bond between the armature 38 and the electromagnet 32.

Figure 1:
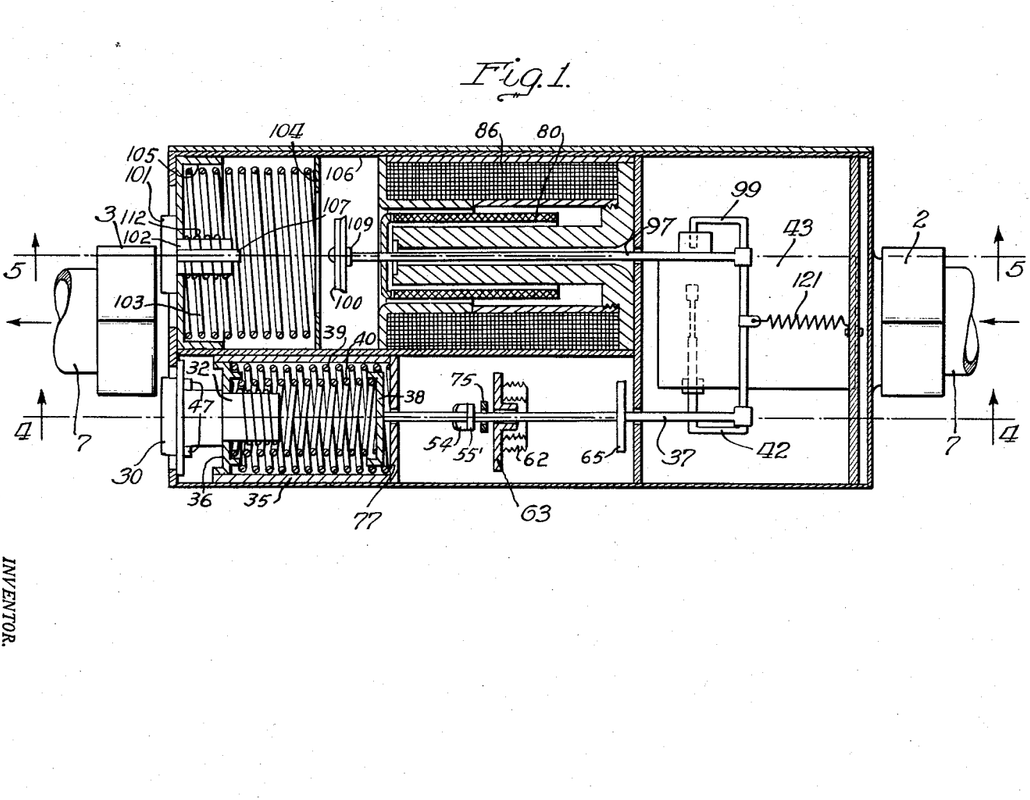
Figure 1 is a sectional plan view of one illustrative embodiment of the invention.
Figure 2:
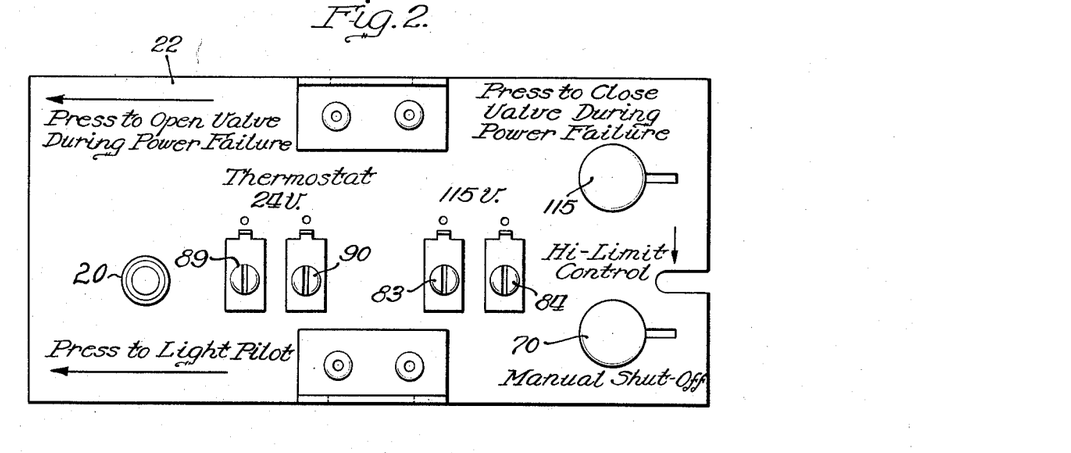
Figure 2 is a plan view of the terminal board of the device.
Figure 3:
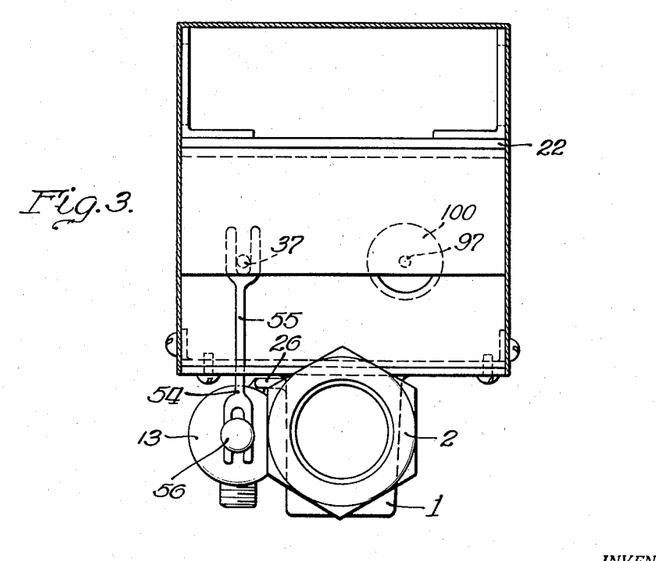
Figure 3 is an end view of the device shown in Figure 1, looking from the right hand end.
Figure 4:
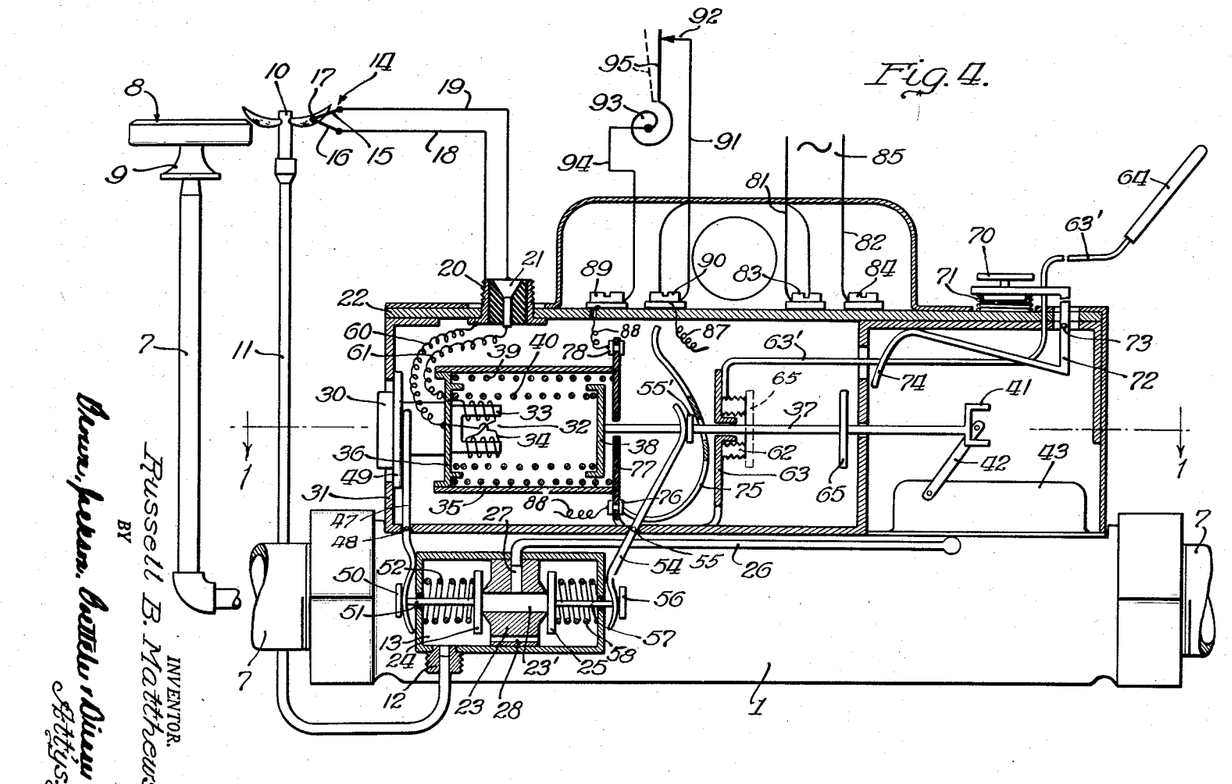
Figure 4 is a longitudinal sectional view, partially in elevation, taken substantially along the line 4—4 of Figure 1 with the line of section offset to pass through the valve means for controlling the supply of gas for the pilot burner.

A conducting contact spring 75, carried at one end by a contact terminal 76 fixed in a support 77, is adapted for movement of its opposite end by its inherent springiness into engagement with a contact terminal 78. Movement of the shaft 37 to the right as the device is shown in Figure 4 causes the abutment or stop 55' to engage the contact spring 75 to remove it from engagement with the contact terminal 78 whereby to remove electrical power from the thermostat or other condition-responsive circuit, as will presently appear.

A cycling electro-inductive valve operator with wound armature 80 provides, for example, power of about 24 volts for the thermostat or other condition-responsive circuit. Lead conductors 81 and 82, connected to terminal screws 83 and 84 (Figure 4), are adapted for placing alternating current, for example, from a source 85 of about 115 volt, 60 cycles alternating current on solenoid winding 86. This produces an electric field which links the winding of the armature 80 and induces a voltage therein which is brought out by flexible leads 87 and 88 to the thermostat connectors 90 and 89 respectively. The connector 90 is connected by a conductor 91 with a fixed contact 92 of a thermostat 93. A conductor 94 connects the other terminal 95 of the thermostat 93 to the other connector 89. In series with the flexible lead 88 are contact 78 and the spring contact 75.

Figure 5:
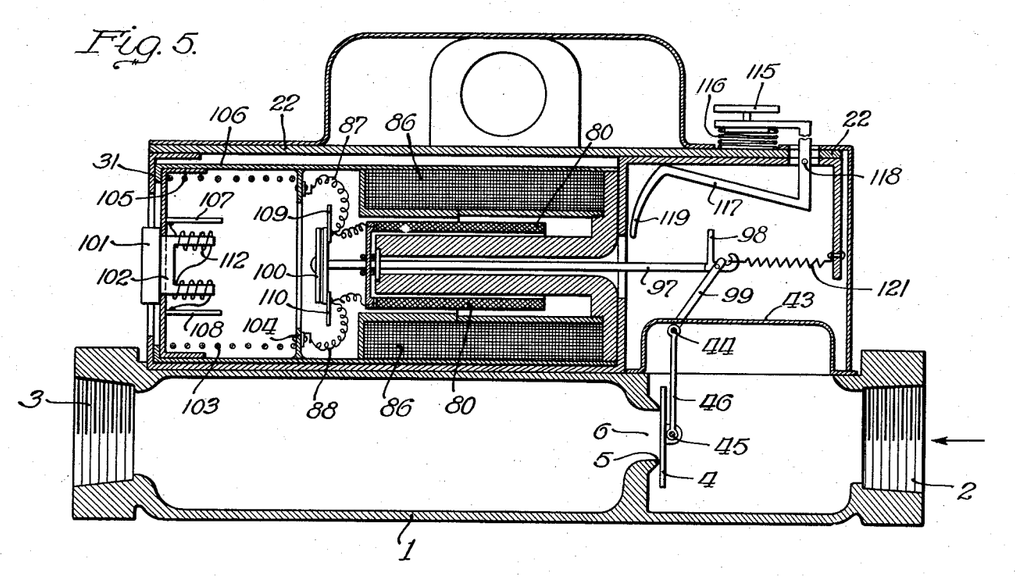
Figure 5 is a longitudinal sectional view taken substantially along the line 5—5 of Figure 1.

The armature 80 is carried by a coaxial shaft 97. One end of this shaft 97 has a stop or abutment 98 which cooperates with a crank arm 99 fixed on the shaft 44 to swing the valve 4 to closed position upon rectilinear movement of the shaft 97 to the right as the device is shown in Figure 5.

The opposite end of the shaft 97 carries an armature 100. A push button 101 is mounted in one end of the cover 31 in spaced relation to the push button 30, and in axial alignment with the armature 100. A permanent magnet 102 is carried on the inner end of the push button 101 for movement into engagement with the armature 100 when the push button 101 is depressed. A coiled spring 103 is interposed and acts between a fixed wall 104 and a cup 105 which is carried by the push button 101 and moves rectilinearly within a housing 106.

Electrical contacts 107 and 108 are adapted to contact electrical contacts 109 and 110 when the permanent magnet 102 is engaged with the armature 100 by depression of the button 101. A coil 112 is wound around the legs of the permanent magnet 102 so that when electric power is restored to the solenoid winding 86, current will be induced in the armature through the winding 112 on the magnet 102, thereby momentarily nullifying the permanent magnetic field linking the armature 100 which allows a spring 121 to restore the armature 80 to its operating position as determined, for example, by the room thermostat 93. The coil 112 is connected in circuit between the contacts 107 and 108.

A push button 115 is mounted, for example, on the terminal board 22 in spaced relation to the push button 70 to be depressed against a spring 116, and acts when depressed to swing a lever 117 counterclockwise about its pivot 118. The lever 117 has an inwardly turned end 119 which, when the button 115 is depressed with the armature 100 held magnetically to the magnet 102, and the magnet 102 and push button 101 are in their outwardly projected positions, is adapted to engage the stop or abutment 98 to break the magnetic bond between the armature 100 and the magnet 102, thereby allowing the spring 121 to restore the armature 80 to its operating position as determined by the room thermostat 93.

Operation

The apparatus is placed in operation by depressing the push button 30 until electromagnet 32 contacts armature 38. Depression of push button 30 also actuates lever 47 to open the valve member 24, which allows gas to flow to the pilot burner 10.

The pilot burner 10 is ignited and heats the hot junction 17 of the thermoelectric generator 14. Thermoelectric current generated by the thermoelectric generator 14 passes to the windings of the electromagnet 32. Depression of the push button 30 also acts on the operating lever 42 through the shaft 37 to hold the valve member 4 closed while lighting the pilot burner. This provides flow interruption during ignition of the pilot burner.

When the electromagnet 32 has been energized sufficiently, armature 38 is held attracted to the electromagnet, so that when push button 30 is released the spring 39 actuates electromagnet 32, armature 38 and shaft 37 as a unit to the left as the device is shown in Figure 4. Push button 30, in returning to its starting or outwardly projecting position, removes lever 47 from engagement with abutment 50, and allows spring 52 to urge the valve member 24 to closed position.

Movement of shaft 37 to the left actuates lever 54 by means of the stop or abutment 55' to open valve member 25 before valve member 24 closes in order to maintain a continuity of gas flow to the pilot burner. Movement of stop 55' to the left also allows spring 75 to engage contact 78, thereby placing, for example, about 24 volts on the thermostat circuit. Movement of shaft 37 to the left also removes stop 41 from engagement with crank arm 42, thereby allowing valve 4 to open and close by means of operating shaft 97 acting under the influence of the room thermostat 93.

High temperature limit function

Cocking the thermoelectric safety device as above set forth moves member 65 into engagement with the bellows 62. Then when the temperature surrounding bulb 64 exceeds a predetermined safe value, bellows 62 expands against member 65 sufficiently to remove armature 38 from electromagnet 32. This allows compressed spring 40 to force armature 38 to the right (Figure 4) and shaft abutment 41 into engagement with crank arm 42 to close valve member 4. The accompanying movement of abutment 55' releases valve member 25 for movement to closed position by spring 58. This movement of abutment 55' also removes spring contact 75 from engagement with contact 78, which removes electric power from the thermostat circuit.

Pilot flame failure protection

When the flame of the pilot burner 10 is extinguished, thermoelectric current in the winding of electromagnet 32 decreases sufficiently to allow compressed spring 40 to force armature 38 to the right (Figure 4) and shaft abutment 41 into engagement with crank arm 42, thus closing valve member 4. Member 55', acting in conjunction with lever 54, allows valve member 25 to be closed by spring 58. This provides 100% shut-off of the gas to the appliance. As in the case of high temperature shut-off, spring contact 75 is also separated from engagement with electrical contact 78, thus removing all electric power from the thermostat circuit.

100% manual shut-off

100% manual shut-off is provided by depressing push button 70 which acts through lever 72 in conjunction with stop 41 to break the magnetic bond between armature 38 and electromagnet 32. This allows compressed spring 40 to close valve 4 in the manner previously described.

Automatic control

When the contacts of room thermostat 93 are open, spring 121 actuates valve 4 to closed position and also positions armature 80 in the air gap in preparation for the next cycle which actuates the armature 80 automatically to open the valve 4.

Manual control during power failure

The valve 4 is opened during electric power failure by depressing push button 101 until permanent magnet 102 engages armature 100. Releasing push button 101 allows compressed spring 103 to move valve member 4 to its open position. Engagement of permanent magnet 102 with armature 100 also causes electrical contacts 109 and 110 to contact with contacts 107 and 108. When electric power is restored to solenoid 86, current will be induced in armature 80 which will flow through the windings 112 of magnet 102, thereby momentarily nullifying the permanent magnetic field linking armature 100. This allows spring 121 to restore armature 80 to its operating position as determined by the room thermostat.

If the power failure is of some duration, it may become necessary or desirable to close the valve. This is accomplished by depressing push button 115 which, by means of lever 117 operating in conjunction with member 99, breaks the magnetic bond between permanent magnet 102 and armature 100. This allows spring 121 to close the valve member 4. When electric power is restored, valve member 4 will respond normally to the control of the room thermostat.

If the valve is opened manually during power failure, high temperature cut-off 64 will operate to close off 100% the flow of gas in the event the temperature surrounding the bulb 64 becomes excessive.

The embodiment of the invention shown in the drawings is for illustrative purposes only, and it is to be expressly understood that said drawings and the accompanying specification are not to be construed as a definition of the limits or scope of the invention, reference being had to the appended claims for that purpose.

I claim:

1. Apparatus of the class described comprising, in combination, a valve, electro-inductive means for opening said valve, said electro-inductive means comprising a solenoid and a first armature which is linked by an electromagnetic field and in which voltage is induced by energization of said solenoid by electric power, said first armature being actuated by the magnetic field set up in opposition to that of the solenoid by current caused to flow in said first armature by the induced voltage, means for opening the valve by the actuation of said first armature, and means for opening said valve during electric power failure and comprising a second armature carried by said first armature and a magnet movable manually into engagement with said second armature to bond magnetically thereto and in a direction to actuate said first armature to open said valve through the magnetic bond between said second armature and said magnet, the resumption of electric power to said solenoid at least momentarily nullifying the permanent magnetic field linking said second armature whereby to break the magnetic bond between said permanent magnet and said second armature.

2. Apparatus according to claim 1 wherein there is a winding inductively coupled to the magnet for inducing current in said magnet when electric power is restored.

3. Apparatus according to claim 1 wherein there is a winding inductively coupled to the magnet for inducing current in said magnet when electric power is restored, and contact means having closed position for completing a circuit for said winding when the magnet is engaged with the second armature and open position opening the circuit for said winding when the magnet and second armature are separated.

4. Apparatus according to claim 1 wherein there is a winding inductively coupled to the magnet for inducing current in said magnet when electric power is restored, and manually operable means for breaking the magnetic bond between the magnet and the second armature to close the valve during electric power failure.

5. Apparatus according to claim 1 wherein there is a winding inductively coupled to the magnet for inducing current in said magnet when electric power is restored, contact means having closed position for completing a circuit for said winding when the magnet is engaged with the second armature and open position opening the circuit for said winding when the magnet and second armature are separated, and manually operable means for breaking the magnetic bond between the magnet and the second armature to close the valve during electric power failure.

6. Apparatus according to claim 1 wherein there is an operating member operatively related to the valve and having thermoelectric means for holding same in retracted position, said operating member being biased so as to be effective when released from said thermoelectric holding means, to actuate the valve to closed position under all conditions of the electro-inductive means.

7. Apparatus according to claim 1 wherein there is an operating member operatively related to the valve and having an armature thereon, a thermoelectric generator, an electromagnet connected in circuit with said thermoelectric generator and movable manually into engagement with said second armature to bond electrically thereto and movable in a direction to actuate said operating member to retracted position when the electromagnet is energized sufficiently by said thermoelectric generator, said operating member being released upon deenergization of said thermoelectric generator and biased to cooperate with said valve to actuate same to closed position under all conditions of the electro-inductive means.

8. Apparatus according to claim 1 wherein there is an operating member operatively related to the valve and having an armature thereon, a thermoelectric generator, an electromagnet connected in circuit with said thermoelectric generator and movable manually into engagement with said second armature to bond electrically thereto and movable in a direction to actuate said operating member to retracted position when the electromagnet is energized sufficiently by said thermoelectric generator, said operating member being released upon deenergization of said thermoelectric generator and biased to cooperate with said valve to actuate same to closed position under all conditions of the electro-inductive means, and manually operable means for breaking the electromagnetic bond between the electromagnet and said last mentioned armature to close the valve.

9. Apparatus according to claim 1 wherein there is an operating member having an armature thereon, a thermoelectric generator, an electromagnet connected in circuit with said thermoelectric generator and movable manually into engagement with said second armature to bond electromagnetically thereto and movable in a direction to actuate said operating member to retracted position when the electromagnet is energized sufficiently by said thermoelectric generator, a push button operatively related to the electromagnet for actuating said electromagnet, the first valve controlling the supply of fuel to a main burner, a second valve operatively related to the flow of fuel for a pilot burner for the main burner for controlling the flow of fuel to the pilot burner, and means for actuating said second valve to open position by actuation of said push button to move the electromagnet into engagement with its armature.

10. Apparatus according to claim 1 wherein there is an operating member having an armature thereon, a thermoelectric generator, an electromagnet connected in circuit with said thermoelectric generator and movable manually into engagement with said second armature to bond electromagnetically thereto and movable in a direction to actuate said operating member to retracted position when the electromanget is energized sufficiently by said thermoelectric generator, said operating member being released upon deenergization of said thermoelectric generator and biased to cooperate with said valve to actuate same to closed position under all conditions of the electro-inductive means, a push button operatively related to the electromagnet for actuating said electromagnet, the first valve controlling the supply of fuel to a main burner, a second valve operatively related to the flow of fuel for a pilot burner for the main burner for controlling the flow of fuel to the pilot burner, means for actuating said second valve to open position by actuation of said push button to move the electromagnet into engagement with its armature, a third valve for controlling the flow of fuel for a pilot burner, means operated by movement of said last-mentioned armature to retracted position with its electromagnet for actuating said third valve to open position ahead of closing of said second valve, and means for closing said third valve by the bias imparted to said operating member when said last mentioned armature is released from its electromagnet.

11. Apparatus according to claim 1 wherein there is an operating member having an armature thereon, a thermoelectric generator, an electromagnet connected in circuit with said thermoelectric generator and movable manually into engagement with said second armature to bond electrically thereto and movable in a direction to actuate said operating member to retracted position when the electromagnet is energized sufficiently by said thermoelectric generator, said operating member being released upon deenergization of said thermoelectric generator and operatively related to the valve to actuate said valve to closed position by the bias on said operating member, and condition responsive means operable upon occurrence of a predetermined condition for breaking the electromagnetic bond between the electromagnet and said last-mentioned armature to close said valve by the bias on said operating member.

12. Apparatus according to claim 1 wherein there is an operating member having an armature thereon, a thermoelectric generator, an electromagnet connected in circuit with said thermoelectric generator and movable manually into engagement with said second armature to bond electrically thereto and movable in a direction to actuate said operating member to retracted position when the electromagnet is energized sufficiently by said thermoelectric generator, said operating member being released upon deenergization of said thermoelectric generator and cooperating with said valve to actuate same to closed position, and condition responsive means operable upon occurrence of a predetermined condition for breaking the electromagnetic bond between the electromagnet and said last-mentioned armature to close said valve, said condition-responsive means comprising a vapor-filled bellows connected to a bulb responsive to rise in temperature, and an abutment member carried by the operating member and held in cooperation with said bellows when said operating member is in retracted position so as to be actuated by expansion of said bellows.

13. Apparatus according to claim 1 wherein there is an operating member having an armature thereon, a thermoelectric generator, an electromagnet connected in circuit with said thermoelectric generator and movable manually into engagement with said second armature to bond electrically thereto and movable in a direction to actuate said operating member to retracted position when the electromagnet is energized sufficiently by said thermoelectric generator, said operating member being released upon deenergization of said thermoelectric generator and cooperating with said valve to actuate same to closed position, a thermostat having a thermostat circuit provided with a spring contact arm biased to closed position, and an abutment on the operating member and cooperable with said spring contact arm to actuate same to open circuit position by movement of the operating member in valve closing direction upon release of said operating member from the electromagnet.

14. Apparatus according to claim 1 wherein the valve is pivoted to swing substantially clear of the stream of fluid when open, whereby to provide a minimum resistance to fluid flow and maximum capacity for a given pressure drop.

15. In a gas control valve, electroresponsive means comprising a solenoid and a first armature having reciprocatory movement therein, a pivoted valve, an operating shaft having reciprocatory movement with said first armature and connected to said value, said connection including a crank arm cooperating with said shaft and actuated to open said valve by movement of the shaft in one direction, spring means for actuating said shaft in the other direction to close said valve, a second armature connected to a second operating shaft operatively coacting with said valve and biased to a safety position effecting closure of said valve, said second shaft and armature having operating positions permitting opening of said valve by said electroresponsive means, a thermoelectric generator, and an electromagnet connected in circuit with said thermoelectric generator and movable manually into engagement with said second armature to bond electromagnetically thereto and movable in a direction to actuate said second shaft to said operating position when the electromagnet is energized sufficiently by said thermoelectric generator.

16. A gas control valve according to claim 15 wherein there is a pivoted lever engageable with an abutment on the second operating shaft to actuate said shaft in a direction to break the electromagnetic bond between the electromagnet and the second armature and to close the valve, and a spring-pressed push button operatively related to said lever for actuating same.

17. Fluid flow controlling apparatus comprising, in combination, a fluid flow controlling member, means biasing said member to a first position, an electromagnetic operator having a source of electric energy for energizing same, an armature movable in a first direction by energization of said electromagnetic operator, movement transmitting means for transmitting movement of said armature in said first direction to said flow controlling member to move it to a second position, said armature being movable in a second direction upon movement of said flow controlling member to its said first position, means for manually operating said flow controlling member to its said second position and moving said armature in its said first direction when electric energy is not available from the source of electric energy for energizing said electromagnetic operator, contact means arranged to establish by the operation of said manually operable means an electric circuit for returning said fluid flow controlling member to control by said electromagnetic operator upon resumption of electric energy from said source, actuator means biased in a direction to actuate said flow controlling member to its said first position in opposition to the action of said electromagnetic operator, and electromagnetic means having a low power source of electric energy for energizing same and adapted when energized to hold said actuator means against the aforesaid operation.

18. Apparatus for controlling flow of fuel to fluid fuel burning apparatus having a main burner and an ignition burner comprising, in combination, a valve controlling flow of fuel to said main burner, means biasing said valve to closed position, an electromagnetic operator having an external source of electric energy for energizing same, an armature movable in a first direction to open said valve upon energization of said magnetic operator, said armature being movable in a second direction upon movement of said valve to closed position, means for manually opening said valve and moving said armature in its said first direction when electric energy is not available from the source of electric energy for energizing said electromagnetic operator, contact means arranged to establish by the operation of said manually operable means an electric circuit for returning said valve to control by said electromagnetic operator upon resumption of electric energy from said external source of electric energy, actuator means biased in a direction to close said valve in opposition to the action of said electromagnetic operator, electromagnetic means adapted when energized to hold said actuator means against the aforesaid operation, and a thermoelectric generator subject to the heat of said ignition burner for energizing said electromagnetic means as long as said ignition burner is ignited but ineffective to energize said electromagnetic means upon extinguishment of the ignition burner flame.

19. Apparatus for controlling flow of fuel to fluid fuel burning apparatus having a main burner and an ignition burner comprising, in combination, a valve controlling flow of fuel to said main burner, means biasing said valve to closed position, an electromagnetic operator having an external source of electric energy for energizing same, an armature movable in a first direction to open said valve upon energization of said magnetic operator, said armature being movable in a second direction upon movement of said valve to closed position, first means for manually opening said valve and moving said armature in its said first direction when electric energy is not available from the source of electric energy for energizing said electromagnetic operator, contact means arranged to establish by the operation of said first means an electric circuit for returning said valve to control by said electromagnetic operator upon resumption of electric energy from said external source of electric energy, actuator means biased in a direction to close said valve in opposition to the action of said electromagnetic operator, electromagnetic means adapted when energized to hold said actuator means against the aforesaid operation, a thermoelectric generator subject to the heat of said ignition burner for energizing said electromagnetic means as long as said ignition burner is ignited but ineffective to energize said electromagnetic means upon extinguishment of the ignition burner flame, and second means for manually resetting said actuator means to the position in which it is held by said electromagnetic means upon energization thereof.

20. Apparatus for controlling flow of fuel to fluid fuel burning apparatus having a main burner and an ignition burner comprising, in combination, a valve controlling flow of fuel to said main burner, means biasing said valve to closed position, an electromagnetic operator having an external source of electric energy for energizing same, an armature movable in a first direction to open said valve upon energization of said electromagnetic operator, said armature being movable in a second direction upon movement of said valve to closed position, first means for manually opening said valve and moving said armature in its said first direction when electric energy is not available from the source of electric energy for energizing said electromagnetic operator, contact means arranged to establish by the operation of said manually operable means an electric circuit for returning said valve to control by said electromagnetic operator upon resumption of electric energy from said external source of electric energy, actuator means biased in a direction to close said valve in opposition to the action of said electromagnetic operator, electromagnetic means adapted when energized to hold said actuator means against the aforesaid operation, a thermoelectric generator subject to the heat of said ignition burner for energizing said electromagnetic means as long as said ignition burner is ignited but ineffective to energize said electromagnetic means upon extinguishment of the ignition burner flame, second means for manually resetting said actuator means to the position in which it is held by said electromagnetic means upon energization thereof, a shut-off valve for controlling flow of fuel to said ignition burner, and means operable by the resetting operation of said second means to open said shut-off valve for flow of fuel to said ignition burner.

21. Apparatus for controlling flow of fuel to fluid fuel burning apparatus having a main burner and an ignition burner comprising, in combination, a valve controlling flow of fuel to said main burner, means biasing said valve to closed position, an electromagnetic operator having an external source of electric energy for energizing same, an armature movable in a first direction to open said valve upon energization of said magnetic operator, said armature being movable in a second direction upon movement of said valve to closed position, first means for manually opening said valve and moving said armature in its said first direction when electric energy is not available from the source of electric energy for energizing said electromagnetic operator, contact means arranged to establish by the operation of said first means an electric circuit for returning said valve to control by said electromagnetic operator upon resumption of electric energy from said external source of electric energy, actuator means biased in a direction to close said valve in opposition to the action of said electromagnetic operator, electromagnetic means adapted when energized to hold said actuator means against the aforesaid operation, a thermoelectric generator subject to the heat of said ignition burner for energizing said electromagnetic means as long as said ignition burner is ignited but ineffective to energize said electromagnetic means upon extinguishment of the ignition burner flame, second means for manually resetting said actuator means to the position in which it is held by said electromagnetic means upon energization thereof, and a switch under control of said second means for controlling the effect of said external source of electric energy on said electromagnetic operator, said switch being closed when said actuator means is held against operation by said electromagnetic means and said second means is released and being opened when the electromagnetic means for holding said actuator means against operation is deenergized.

22. Fluid flow controlling apparatus comprising, in combination, a fluid flow controlling member, means biasing said member to a first position, an electromagnetic operator having a source of electric energy for energizing same, an armature movable in a first direction by energization of said electromagnetic operator, movement transmitting means for transmitting movement of said armature in said first direction to said flow controlling member to move it to a second position, said armature being movable in a second direction upon movement of said flow controlling member to its said first position, a slidably mounted push button operable to operate said flow controlling member to its second position and movement of said armature in its said first direction when electric energy is not available from the source of electric energy for energizing said electromagnetic operator, and contact means arranged to establish by the operation of said manually operable means an electric circuit for returning said fluid flow controlling member to control by said electromagnetic operator upon resumption of electric energy from said source.

23. A control device for fluid fuel burning apparatus having a main burner and a pilot burner, a main control member biased to fuel feed preventing position for preventing fuel feed to said main burner, an electromagnetic operator effective when energized to actuate said main control member from fuel feed preventing position to fuel feed permitting position, a pilot burner control member biased to fuel feed preventing position for preventing fuel feed to said pilot burner, an armature operatively associated with both said main control member and said pilot burner control member, and an electromagnet energized by a thermoelectric generator and effective when energized to hold said armature in attracted position and said pilot burner control member in fuel feed permitting position, said armature upon deenergization of said electromagnet being released and effective to release said pilot burner control member for actuation to fuel feed preventing position by its biasing means and also effective while said electromagnetic operator is energized and holding said main control member in fuel feed permitting position mechanically to actuate said main control member to fuel feed preventing position.

24. A control device for fluid fuel burning apparatus having a main burner and a pilot burner, a main control member biased to fuel feed preventing position for preventing fuel feed to said main burner, an electromagnetic operator effective when energized to actuate said main control member from fuel feed preventing position to fuel feed permitting position, a pilot burner control member biased to fuel feed preventing position for preventing fuel feed to said pilot burner, an armature operatively associated with both said main control member and said pilot burner control member, an electromagnet energized by a thermoelectric generator and effective when energized to hold said armature in attracted position and said pilot burner control member in fuel feed permitting position, said armature upon denergization of said electromagnet being released and effective to release said pilot burner control member for actuation to fuel feed preventing position by its biasing means and also effective while said electromagnetic operator is energized and holding said main control member in fuel feed permitting position mechanically to actuate said main control member to fuel feed preventing position, and manually operable means effective while said electromagnetic operator is energized and holding said main control member in fuel feed permitting position mechanically to release said armature from its electromagnet for movement of said armature to retracted position and both said main control member and said pilot burner control member to their fuel feed preventing positions.

25. A control device for fluid fuel burning apparatus having a main burner and a pilot burner, a main control member biased to fuel feed preventing position for preventing fuel feed to said main burner, an electromagnetic operator effective when energized to actuate said main control member from fuel feed preventing position to fuel feed permitting position, a pilot burner control member biased to fuel feed preventing position for preventing fuel feed to said pilot burner, an armature operatively associated with both said main control member and said pilot burner control member, an electromagnet energized by a thermoelectric generator and effective when energized to hold said armature in attracted position and said pilot burner control member in fuel feed permitting position, said armature upon deenergization of said electromagnet being released and effective to release said pilot burner control member for actuation to fuel feed preventing position by its biasing means and also effective while said electromagnetic operator is energized and holding said main control member in fuel feed permitting position mechanically to actuate said main control member to fuel feed preventing position, and a high temperature limit control effective at a high temperature limit and while said electromagnetic operator is energized and holding said main control member in fuel feed permitting position mechanically to actuate said main control member to fuel feed preventing position and to release said pilot burner control member for actuation to fuel feed preventing position by its biasing means.

26. A control device for fluid fuel burning apparatus comprising, in combination, a control member biased to fuel feed preventing position, an electromagnetic operator having an armature operatively associated with said control member and effective when energized to actuate said armature and thereby said control member from fuel feed preventing position to fuel feed permitting position against said bias, and magnetic means biased to retracted position and manually movable to position to pick up said armature in its fuel preventing position, said magnetic means when released following its movement to pick up relation with said armature being effective by its bias to actuate said control member to its fuel feed permitting position.

27. A control device for fluid fuel burning apparatus comprising, in combination, a control member biased to fuel feed preventing position, an electromagnetic operator having an armature operatively associated with said control member and effective when energized to actuate said armature and thereby said control member from fuel feed preventing position to fuel feed permitting position against said bias, magnetic means comprising a permanent magnet biased to retracted position and manually movable to position to pick up said armature in its fuel feed preventing position, said magnetic means when released following its movement to pick up relation with said armature being effective by its bias to actuate said control member to its fuel feed permitting position, and a winding effective upon energization of said electromagnetic operator to nullify the holding effect of said permanent magnet for restoration of said armature to position determined by said electromagnetic operator.

28. A device for controlling the flow of fluid fuel or the like, comprising a flow-controlling member biased to a flow-preventing position and movable to a flow-permitting position, a cycling electromagnetic operator connected to said flow-controlling member and normally operable when energized to move the latter against said bias to flow-permitting position, overcalling control means operatively coacting with said flow-controlling member, said control means comprising a movable member biased to a first position and movable against said bias to a second position, releasable holding means for holding said movable member in said second position when moved thereto, and manually operable means for selectively releasing said movable member from said holding means, said control means being so disposed that when said movable member is in said second position said flow-controlling member is free for actuation by said cycling operator, and when said movable member is in said first position, said flow-controlling member is held in flow-preventing position by said control means with greater force than can be exerted thereon by energization of said operator.

29. A device for controlling the flow of fluid fuel or the like, comprising a flow-controlling member biased to a flow-preventing position and movable to a flow-permitting position, a cycling electromagnetic operator connected to said flow-controlling member and normally operable when energized to move the latter against said bias to flow-permitting position, overcalling control means operatively coacting with said flow-controlling member, said control means comprising a movable member biased to a first position and movable against said bias to a second position, releasable holding means for holding said movable member in said second position when moved thereto, and condition responsive means for releasing said movable member from said holding means in response to a predetermined condition, said control means being so disposed that when said movable member is in said second position said flow-controlling member is free for actuation by said cycling operator, and when said movable member is in said first position, said flow-controlling member is held in flow-preventing position by said control means with greater force than can be exerted thereon by energization of said cycling operator tending to move said flow-controlling member to flow-permitting position.

30. A device for controlling the flow of fluid fuel or the like, comprising a flow-controlling member biased to a flow-preventing position and movable to a flow-permitting position, a cycling electromagnetic operator connected to said flow-controlling member and operable when energized to move the latter against said bias to flow-permitting position, manually operable means for moving said flow-controlling member to flow-permitting position during electric power failure, overcalling control means operatively coacting with said manually operable means, said control means comprising a movable member biased to a first position and movable against said bias to a second position, and releasable holding means for holding said movable member in said second position when moved thereto, said control means being so disposed that when said movable member is in said second position said manually operable means is free to actuate said flow-controlling member, and when said movable member is in said first position, said control means overcalls said manually operable means and prevents actuation of said flow-controlling member by said manually operable means.

31. A device for controlling the flow of fluid fuel or the like, comprising a flow-controlling member biased to a flow-preventing position and movable to a flow-permitting position, a cycling electromagnetic operator connected to said flow-controlling member and operable when energized to move the latter against said bias to flow-permitting position, manually operable means for moving said flow-controlling member to flow-permitting position during electric power failure, overcalling resettable control means operatively coacting with said manually operable means, said control means comprising relatively movable armature and electromagnet means biased to separated relation, and movable against said bias to attracted relation, and generator means in circuit with said electromagnet means for energizing the latter to produce an electromagnetic bond holding said armature and electromagnet means in attracted relation when moved thereto, said control means being so disposed that when said armature and electromagnet means are in attracted relation said manually operable means is free to actuate said flow-controlling member, and when said armature and electromagnet means are in separated relation said control means overcalls said manually operable means and prevents actuation of said flow-controlling member on said manually operable means.

32. A device for controlling the flow of fluid fuel or the like, comprising a flow-controlling member biased to a flow-preventing position and movable to a flow-permitting position, a cycling electromagnetic operator connected to said flow-controlling member and operable when energized to move the latter against said bias to flow-permitting position, manually operable means for moving said flow-controlling member to and retaining the latter in flow-permitting position during electric power failure, overcalling control means operatively coacting with said manually operable means, said control means comprising a movable member biased to a first position and movable against said bias to a second position, and releasable holding means for holding said movable member in said second position when moved thereto, said control means being so disposed that when said movable member is in said second position said manually operable means is free to actuate said flow-controlling member and to retain the latter in flow-permitting position, release of said movable member by said holding means and movement thereof to said first position being effective to release said flow-controlling member from said retaining means for movement to flow-preventing position under its bias, said control means also being positioned so that when said movable member is in said first position, said control means overcalls said manually operable means and prevents actuation of said flow-controlling member by said manually operable means.

33. A device for controlling the flow of fluid fuel or the like, comprising a flow-controlling member biased to a flow-preventing position and movable to a flow-permitting position, a cycling electromagnetic operator connected to said flow-controlling member and operable when energized to move the latter against said bias to flow-permitting position, manually operable means for moving said flow-controlling member to flow-permitting position during electric power failure, overcalling condition responsive control means operatively coacting with said manually operable means, said control means comprising a movable member biased to a first position and movable against said bias to a second position, and condition responsive holding means for holding said movable member in said second position when moved thereto, said holding means releasing said movable member in response to a predetermined condition, said control means being so disposed that when said movable member is in said second position said manually operable means is free to actuate said flow-controlling member, and when said movable member is in said first position, said control means overcalls said manually operable means and prevents actuation of said flow-controlling member by said manually operable means.

34. A device for controlling the flow of fluid fuel or the like, comprising a flow-controlling member biased to a flow-preventing position and movable to a flow-permitting position, a cycling electromagnetic operator having a control circuit and connected to said flow-controlling member and operable when energized to move the latter against said bias to flow-permitting position, manually operable means for moving said flow-controlling member to flow-permitting position during electric power failure, overcalling control means operatively coacting with said manually operable means, said control means comprising a movable member biased to a first position and movable against said bias to a second position, and releasable holding means for holding said movable member in said second position when moved thereteo, and switch means in said circuit operatively associated with said control means and actuated by movement of said movable member to its first position for preventing said operator from tending to move said flow-controlling member to flow-permitting position when said movable member is in its first position, said control means being so disposed that when said movable member is in said second position said manually operable means is free to actuate said flow-controlling member, and when said movable member is in said first position, said control means overcalls said manually operable means and prevents actuation of said flow-controlling member by said manually operable means.

35. A device for controlling the flow of fluid fuel or the like, comprising a flow-controlling member biased to a flow-preventing position and movable to a flow-permitting position, a cycling electromagnetic operator connected to said flow-controlling member and operable when energized to move the latter against said bias to flow-permitting position, manually operable means for moving said flow-controlling member to flow-permitting position during electric power failure, overcalling control means operatively coacting with said manually operable means, said control means comprising a movable member biased to a first position and movable against said bias to a second position, releasable holding means for holding said movable member in said second position when moved thereto, and manually operable means for releasing said holding means to effect movement of said movable member to its first position under its bias, said control means being so disposed that when said movable member is in said second position said manually operable means is free to actuate said flow-controlling member, and when said movable member is in said first position, said control means overcalls said manually operable means and prevents actuation of said flow-controlling member by said manually operable means.

36. A device for controlling the flow of fluid fuel or the like, comprising a flow-controlling member biased to a flow-preventing position and movable to a flow-permitting position, a cycling electromagnetic operator connected to said flow-controlling member and operable when energized to move the latter against said bias to flow-permitting position, manually operable means for moving said flow-controlling member to flow-permitting position during electric power failure, overcalling control means operatively coacting with said manually operable means, said control means comprising a movable member biased to a first position and movable against said bias to a second position, releasable holding means for holding said movable member in said second position when moved thereto, and condition responsive means positioned to mechanically effect release of said movable member from said holding means to permit movement of said member to its first position under its bias, said control means being so disposed that when said movable member is in said second position said manually operable means is free to actuate said flow-controlling member, and when said movable member is in said first position, said control means overcalls said manually operable means and prevents actuation of said flow-controlling member by said manually operable means.

37. A device for controlling the flow of fluid fuel or the like, comprising a flow-controlling member biased to a flow-preventing position and movable to a flow-permitting position, a cycling electromagnetic operator connected to said flow-controlling member and operable when energized to move the latter against said bias to flow-permitting position, means operatively associated with said flow-controlling member for manually actuating the latter to and retaining the latter in flow-permitting position during electric power failure, said means comprising, relatively movable magnet and armature means, manual operation of said actuating means effecting engagement and magnetic bonding of said armature and magnet means, said magnetic bond having sufficient strength to retain said flow-controlling member in flow-permitting position against said bias, and a winding inductively coupled to said magnet means and energizable by resumption of power for generating a magnetic field effective to release the magnetic bond between said armature and magnet means and thereby to release said valve from said retention means in response to said resumption of power.

38. Control apparatus comprising in combination an electromagnetic operator having an armature biased to a first position and movable by energization of said operator to an actuated position, manual actuating means for moving said armature to an actuated position against its bias during failure of the power supply to said operator, and overcalling control means operatively coacting with said armature and manual actuating means and capable of holding said armature in said first position with greater force than that which can be exerted on said armature by energization of said operator or by said manually operable means.

References Cited in the file of this patent

UNITED STATES PATENTS

| Re. 22,068 | Joesting | Apr. 14, 1942 |
| 2,159,624 | Shipley | May 23, 1939 |
| 2,217,785 | Betz | Oct. 15, 1940 |
| 2,265,294 | Lange | Dec. 9, 1941 |
| 2,269,016 | Gille | Jan. 6, 1942 |
| 2,276,909 | Alfery | Mar. 17, 1942 |
| 2,290,048 | Hildebrecht | July 14, 1942 |
| 2,299,286 | Wantz | Oct. 20, 1942 |
| 2,299,649 | Paille | Oct. 20, 1942 |
| 2,604,266 | Jackson | July 22, 1952 |
| 2,607,529 | Garner | Aug. 19, 1952 |
| 2,608,353 | Cobb | Aug. 26, 1952 |